United States Patent [19]
Grosseau

[11] 3,977,732
[45] Aug. 31, 1976

[54] SAFETY BRAKE DEVICE FOR SERVO-CONTROLLED BRAKE SYSTEM

[75] Inventor: Albert Grosseau, Paris, France

[73] Assignee: Societe Anonyme Automobiles Citroen, Paris, France

[22] Filed: May 21, 1975

[21] Appl. No.: 579,728

[30] Foreign Application Priority Data
May 27, 1974 France .............................. 74.18253

[52] U.S. Cl. .................... 303/6 R; 60/582; 188/106 F; 188/106 P; 303/13; 303/52
[51] Int. Cl.² ......................................... B60T 15/16
[58] Field of Search ................. 303/6 R, 6 M, 9, 10, 303/13, 50, 52, 89, 71, 21 F; 188/152, 151 A, 265, 353, 152, 359, 106 F, 106 P; 60/580, 548, 581, 582

[56] References Cited
UNITED STATES PATENTS

| | | | |
|---|---|---|---|
| 3,159,434 | 12/1964 | Stelzer | 303/9 X |
| 3,333,902 | 8/1967 | Liverance et al. | 188/106 F |
| 3,463,276 | 8/1969 | Brooks, Jr. | 303/9 X |
| 3,724,911 | 4/1973 | Chevreux | 303/9 X |
| 3,727,986 | 4/1973 | Koivunen | 303/10 X |
| 3,738,712 | 6/1973 | Flory | 303/10 X |
| 3,830,549 | 8/1974 | Kito et al. | 303/6 R |

*Primary Examiner*—Stephen G. Kunin
*Assistant Examiner*—Douglas C. Butler
*Attorney, Agent, or Firm*—Wenderoth, Lind & Ponack

[57] ABSTRACT

A safety brake pedal for power-assisted brake systems of motor vehicles of the type having a source of fluid under pressure includes a member adapted to transmit the brake control effort and associated with and normally locked to the brake pedal by an assembly responsive to the fluid from the source. The interlocking action is removed in case of accidental drop or failure in the fluid pressure, the extra free stroke of the brake pedal thus permitted being utilized for actuating a safety brake.

10 Claims, 6 Drawing Figures

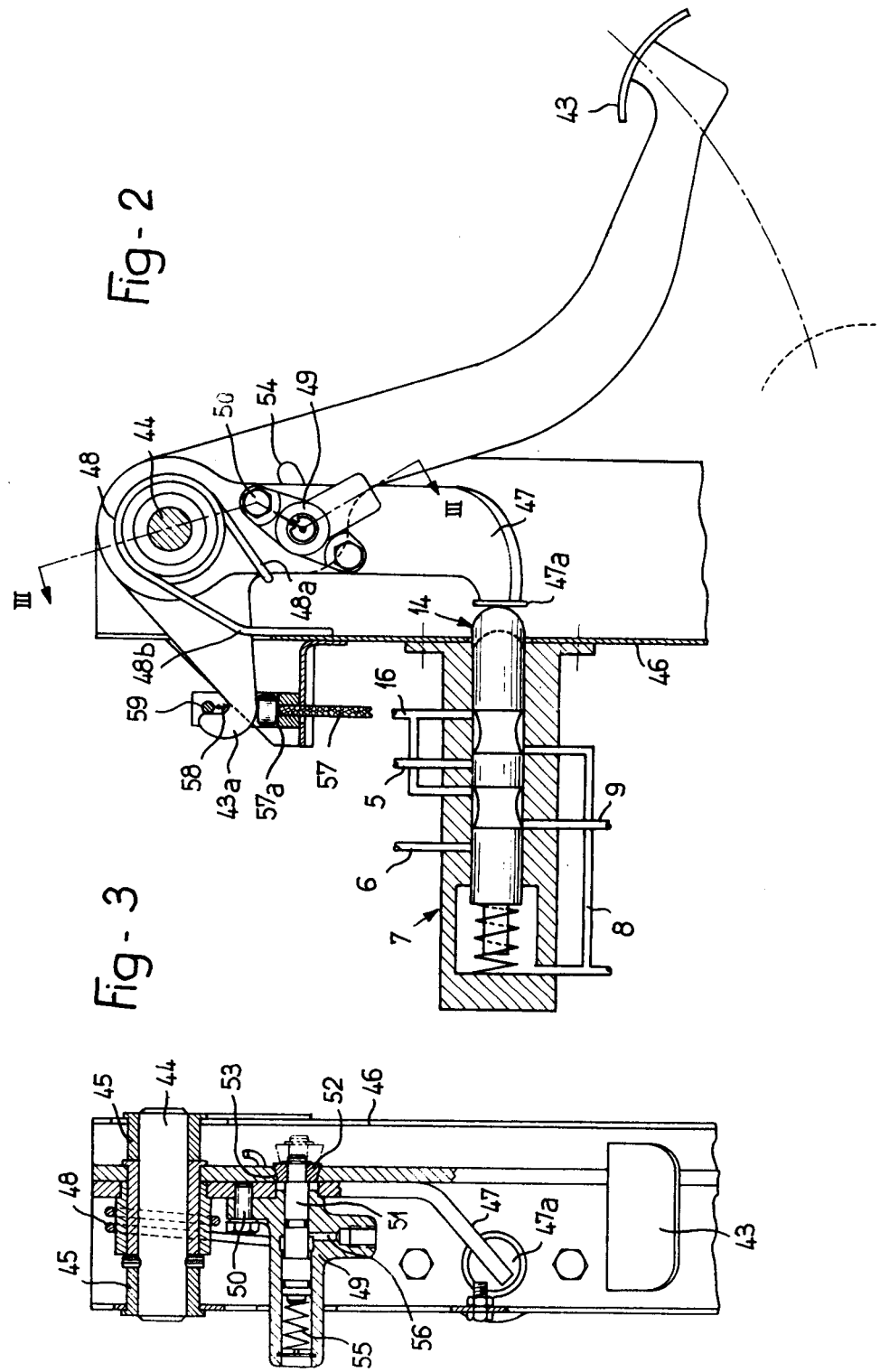

SAFETY BRAKE DEVICE FOR SERVO-CONTROLLED BRAKE SYSTEM

BACKGROUND AND SUMMARY OF THE INVENTION

The present invention relates in general to brake systems of motor vehicles and has specific reference to a servo-controlled brake device intended for making up any failure in the normal servo control means by implementing safety brake means, the device according to this invention being particularly simple and efficient, and becoming operative automatically in case of failure of the normal servo control means as the driver continues to depress the brake pedal normally.

Basically and for this purpose the safety brake device according to this invention for a servo-controlled brake system of motor vehicles of the type having a source of fluid under pressure, is characterized in that it comprises a member which is adapted to transmit the braking effort exerted by the driver and which is associated with the normal foot-operated control member, such as the conventional brake pedal, and operatively connected to the normal control member through locking means such that the locking means is maintained in a locking position by the fluid under pressure from the source and released in case of pressure drop or failure to permit an extra stroke of the normal control member which is utilized for operating safety brake means.

The manner in which this locking action may be provided through simple hydraulic or hydromechanical means will be explained presently in detail, the safety brake means being notably of the hydraulic or mechanical type.

BRIEF DESCRIPTION OF THE DRAWING

Various embodiments of the safety brake device of this invention will now be described by way of example with reference to the accompanying drawings, in which:

FIG. 2 is a side elevational and part-sectional view of a modified embodiment of the safety brake device;

FIG. 3 is a front elevational and part-sectional view of the device of FIG. 2, the section being taken along the line III-III of FIG. 2;

DETAILED DESCRIPTION OF THE INVENTION

Figure 1:
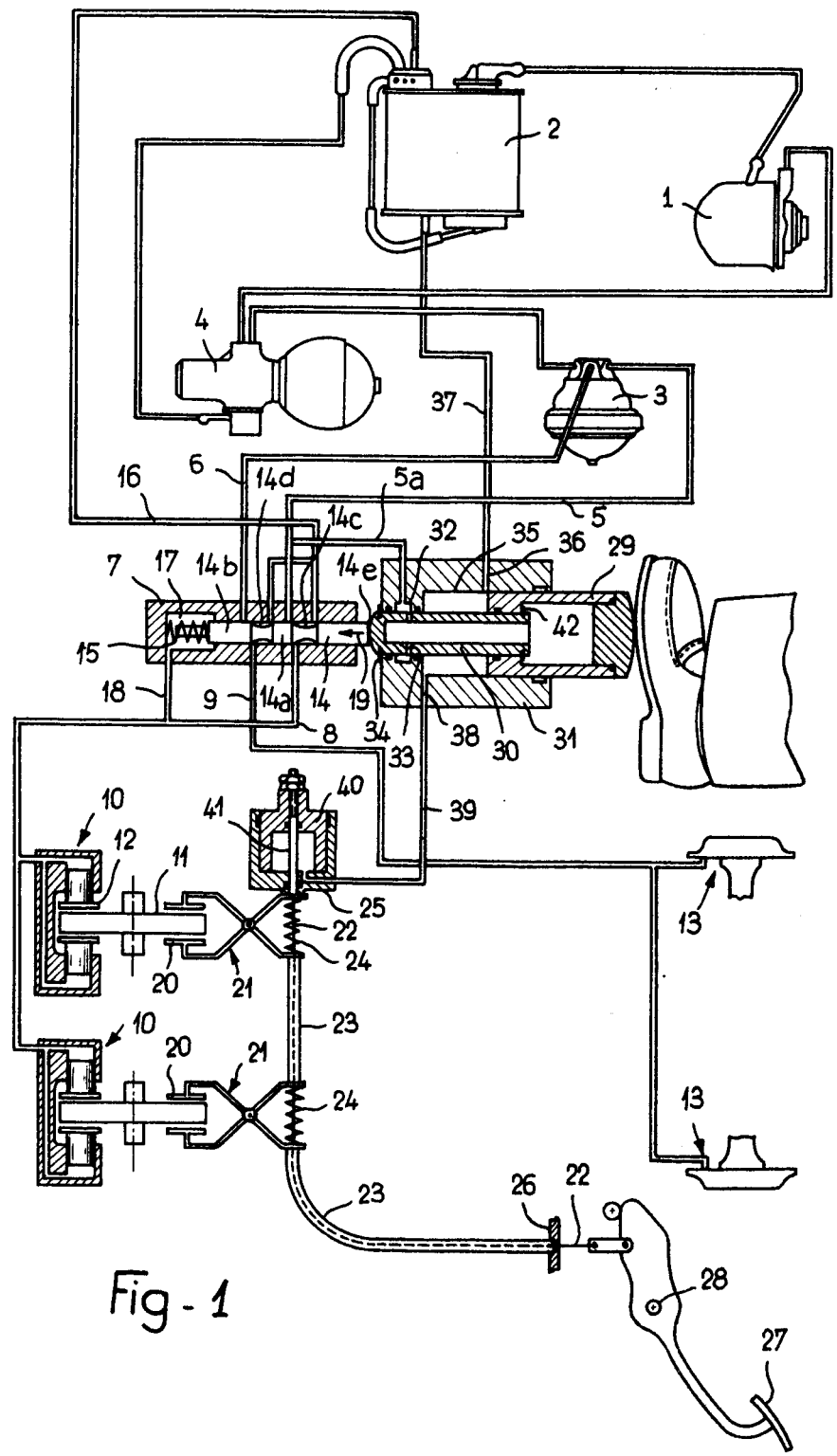
FIG. 1 is a diagrammatic general view of a servo-action brake system equipped with the safety brake device of this invention.
Figure 4:
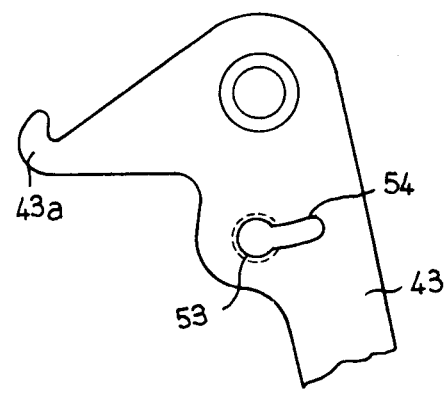
FIG. 4 is a fragmentary detailed view of the control pedal shown in FIGS. 2 and 3.

Referring firstly to FIG. 1, there is illustrated diagrammatically a typical and known hydraulic brake system equipped with the safety brake device of this invention.

This known brake system comprises a hydraulic pump 1 drawing fluid from a reservoir 2 and feeding such fluid under pressure to a unit 3 comprising two pressure accumulators via a line breaker 4 adapted to keep the pressure in the accumulators between two predetermined limit values.

These accumulators are connected via pipe lines 5 and 6 to a pressure fluid metering and distributing device 7 respectively, adapted to feed separately via corresponding lines 8 and 9 on the one hand the front wheel brakes 10 illustrated in the form of brake disks 11 and friction linings 12, and on the other hand the rear wheel brakes 13 of the vehicle, illustrated in the form of drum and shoe brakes.

The fluid pressure metering and distributor device 7 comprises a piston or spool valve 14 urged by a spring 15 to its inoperative position as shown in FIG. 1, wherein the spools 14a and 14b close the ports leading to and from the distributor via pipes 5 and 6, respectively. A pair of grooves 14c, 14d adjacent spools 14a, 14b provide in this case a fluid connection between distributor passages corresponding to pipes 8, 9 and other passages communicating with a return line 16 leading to the reservoir 2. A reaction chamber 17 is formed in the distributor at the spool valve end responsive to spring 15, chamber 17 communicating via a pipe line 18 with the front wheel brake line 8.

It is thus clear that the braking action is obtained by exerting on the end 14e of spool valve 14 a thrust in the direction of the arrow 19 so as to close the ports leading to the return line 16 and therefore to the reservoir 2 while opening the communication between pipe lines 5, 6 and pipe lines 8, 9, respectively, within the limit of the desired braking pressure, which in any case is felt by the driver due to the exertion of this pressure against the spool valve in chamber 17, against the braking effort exerted in the direction of the arrow 19. It may also be seen that the front brake circuit is independent of the rear brake circuit for obvious safety reasons.

The parking and emergency brake contemplated comprises in this example friction shoes 20 associated with the front brake disks and carried by jaws 21 controlled through cables 22 and flexible sheaths 23 of the Bowden type. The jaws 21 are constantly urged to their open or release position by compression springs 24, one interposed between two sheath sections and another between one of these sheath sections and a member 25 the function of which will be explained presently, the other sheath section in this case bearing or reacting against a fixed portion 26 of the vehicle.

In this example, the cable 22 is actuated by means of a pedal 27 fulcrumed to a shaft 28, but of course a conventional hand control member may also be provided for this purpose, the means for locking or latching this parking and emergency brake in the operative position being omitted from the drawing since it is no part of the present invention.

The safety brake device according to this invention is designed with a view to permit, in the above described brake system, a normal foot operation of the spool valve 14, this movement being adapted to be converted automatically into an actuation of the parking and emergency brake in case of failure in the circuit supply fluid under pressure to the brakes.

This device comprises essentially a push-button or knob type foot-operated control member 29 and a braking effort transmitting member 30 co-acting with spool valve 14, these members 29 and 30 consisting of hollow and fluid-tight telescopic elements mounted for guided and fluid-tight sliding movement in a body 31 having therein two concentric bores receiving and corresponding in size to members 29 and 30.

In the bore receiving and guiding the transmission member 30 a circular groove 32 for supplying pressure fluid interiorly of the telescopic members 29 and 30 is formed, this groove 32 communicating permanently with radial passages 33 formed through member 30. In other words, this communication is such that it subsists throughout the permissible stroke of member 30 which corresponds to the stroke controlling the movement of spool valve 14. Groove 32 is further connected via a passage formed in body 31 and a pipe line 5a to the pipe line 5 supplying pressure fluid to the front brakes. Effort transmitting member 30 is urged to its inoperative position by spring 15 via spool valve 14, this inoperative position being limited and determined by a circlip 34 carried by member 30 and adapted to engage the inner end of body 31.

The control member 29 further acts as a piston slidably mounted in a hydraulic cylinder 35 formed by the corresponding bore of body 31 and connected by a passage 36 to a pipe line 37 leading from reservoir 2 for supplying fluid to the cylinder under load. The bottom or inner end of cylinder 35 is connected via a passage 38 and a pipe line 39 to a hydraulic unit comprising a cylinder consisting of the above-mentioned member 25 and a piston 40 having a rod 41 to one end of which cable 22 is attached.

The pressure fluid fed via pipe lines 5 and 5a into members 29 and 30 urges these members to their expanded state, i.e., to their position of mutual abutment as determined in this example by an inner circlip 42. In other words, a hydraulic locking action is produced between these members 29 and 30 so that they operate as a single and rigid member, as long, of course, as fluid under pressure is supplied from the corresponding accumulator to the front brakes.

In the expanded and inoperative position of members 29 and 30, as illustrated in FIG. 1, the foot-operated control member 29 does not cover, and is just adjacent to, the port leading to the passage 36 supplying fluid to the cylinder 35 under load.

Thus, in case the front brake fluid supply pressure drops accidentally, the above-mentioned hydraulic locking action exerted between members 29 and 30 would be released and the foot-operated control member 29 would be depressed automatically beyond its relatively short normal stroke obtained under servo-action conditions, due to the normal reaction of the driver, and this member 29 then behaves like a piston of a brake master cylinder to force the fluid from cylinder 35 into the hydraulic receiver 25 – 40. Under these circumstances, the resulting expansion of this unit 25 – 40 is attended by the actuation of the pair of jaws 21 of the parking and emergency brake in the direction to press the brake shoes 20 against the brake disks 11. This braking action is thus subordinate to the hydrostatic pressure imparted to the fluid trapped in cylinder 35 and hydraulic receiver 25 – 40 by the effort exerted by the driver on the foot-operated control member 29.

FIGS. 2 and 3 illustrate a modified embodiment of the invention which incorporates a hydromechanical locking system. The foot-operated control member consists in this case of a conventional pedal 43 fulcrumed to a shaft 44 mounted in bearings 45 forming inserts in a bracket 46 of bent sheet metal, adapted to be secured to the dash-board (not shown) of the vehicle. In this modified assembly the effort transmitting member consists of an intermediate member 47 also fulcrumed to shaft 44. Therefore, pedal 43 and member 47 are normally urged to their inoperative position as shown in the drawing by a torsion spring 48 wound around their fulcrum shaft and having one arm 48a bent to urge the pedal and member to the inoperative position and another arm 48b adapted to react against bracket 46. The intermediate member 47 carries at its free end a tappet 47a engaging the outer end of the spool valve 14 of the fluid-pressure metering and distributing device 7 similar to the one described hereinabove with reference to the preceding embodiment, the hydraulic circuit means of this device, which are the same as those illustrated in FIG. 1, being simply designated by the same reference numerals.

The intermediate member 47 carries in a body 49 secured thereto by screw 50 a hydraulic piston 51 having secured to its outer end a locking member adapted to lock the pedal 43 and consisting of a frustoconical ring 52 engaging a matching aperture 53 formed in pedal 43 at the end of an elongated hole 54 narrower than ring 52 and of arcuate contour centered to the axis of the pedal pivot shaft 44. The width of elongated hole 54 is such that the piston 51 can move freely therealong under conditions to be set forth presently. In fact, the piston 51 is urged by a compression spring 55 to the position in which the locking ring 52 is disengaged from aperture 53 (the position shown by dash and dot lines in FIG. 3). However, hydraulic piston 51 is a differential piston slidably mounted in two bores of different diameters which are formed in body 49, a port 56 opening into the junction of these bores for introducing fluid under pressure, such port being connected via a pipe line, such as 5a of FIG. 1, to the pressure fluid source. Thus, the piston 51 is normally urged by the pressure fluid to the position shown in solid lines in FIG. 3, with its frustoconical lock ring 52 engaged in aperture 53 so as to lock pedal 43 and member 47 to each other.

The control pedal 43 includes a safety brake member which in this embodiment comprises a hook-shaped extension 43a adapted to actuate the nipple 57a of a Bowden cable 57 for controlling a brake (not shown), for example the conventional parking brake actuated by means of a sheath-covered cable, it being understood however that the pedal 43 could also for the same purpose actuate a hydraulic cylinder controlling a safety brake of any suitable type, for example as shown in FIG. 1, or of a fully hydraulic type. In the present instance, this safety brake actuation occurs only after exhausting a certain backlash 58 in the permissible stroke of pedal 43 which corresponds to the normal stroke necessary for actuating the spool valve 14 of the pressure fluid distributing and metering device 7, this backlash 58 being provided between hook-shaped extension 43a and a stud 59 for driving the cable nipple 57a.

It is thus clear that under normal operating or braking conditions, the control pedal 43 carries the intermediate member 47 through hydromechanical locking means and that the latter transmits to the brake fluid distributing and metering device the brake control pressure or effort exerted by the driver.

However, if the brake supply pressure drops accidentally, the differential piston 51 would be responsive only to its compression spring 55 so as to disengage the locking ring 52 from the aperture 53, so that the pedal 43 would be depressed automatically beyond its normal stroke designated by the arrows 58, the piston 51 moving in this case along the elongated hole 54. In other words, in this case this additional or extra authorized stroke of pedal 43 is attended by the actuation of a safety brake requiring a greater effort from the driver compared with the effort required for a normal brake application, for braking and eventually stopping the vehicle during its operation.

Figure 5:
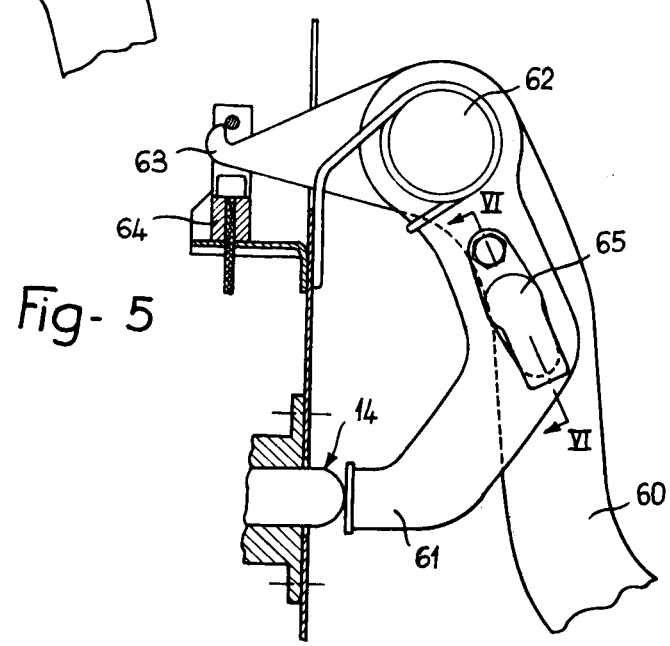
FIG. 5 is a side elevational and part-sectional view showing another modified embodiment of the safety brake device.
Figure 6:
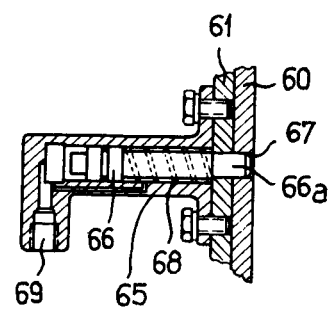
FIG. 6 is a detailed view showing in axial section the locking means associated with the device of FIG. 5, and taken along line VI-VI of FIG. 5.

FIGS. 5 and 6 illustrate another modified embodiment of the safety brake device of this invention which comprised a hydromechanical locking device associated with a conventional brake member 61 and an intermediate pedal 61 both fulcrumed to a common pivot shaft 62. Intermediate member 61 co-acts likewise with the spool valve 14 of a fluid pressure distributing and metering device, and the main control pedal 60 is formed with a hook-shaped extension 63 for controlling the nipple 64 of a safety brake control cable (not shown). The intermediate member 61 carries in a body 65 secured thereto by means of screws a hydraulic piston 66 of which the external, bolt-like end portion 66a extends through intermediate member 61 and engages a hole 67 formed in normal control pedal 60. This piston 66 is urged by a compression spring 68 to its release position, i.e., outside the hole 67, but as a hydraulic piston it is responsive to the fluid under pressure received from source via a port 69 connected to the source. The arrangement is such that piston 66 is normally kept in its locking position shown in solid lines in FIG. 6, in which pedal 60 and member 61 are interlocked. The mode of operation of this arrangement is similar to that of the preceding embodiment, the withdrawal of bolt end portion 66a from control pedal 60 corresponding to the disengagement of locking ring 52 occurring under the same conditions as set forth hereinabove in connection with the preceding arrangement, in order to permit the automatic actuation of the safety brake during an extra stroke of the normal brake pedal 60.

Although specific embodiments of this invention have been described hereinabove and illustrated in the accompanying drawings, it will readily occur to those skilled in the art that various modifications and changes may be made thereto without departing from the scope of the invention as set forth in the appended claims.

What is claimed as new is:

1. A safety brake device for use in a servo-controlled motor vehicle brake system of the type including a fluid pressure source, fluid operated vehicle braking means, safety vehicle braking means, servo valve means fluid connected between said fluid pressure source and said fluid operated vehicle braking means, and movable conventional foot-operated servo-control means for selectively operating said servo valve means to supply fluid under pressure from said fluid pressure source to said fluid operated vehicle braking means for a normal braking operation; said device comprising:
   an intermediate member means adapted to be operatively connected between said servo-control means and said servo valve means for transmitting movement of said servo-control means to said servo valve means;
   means, responsive to pressure from said fluid pressure source, for locking said intermediate member means in a fixed position with respect to said servo-control means during normal braking operation and for releasing said servo-control means upon drop of pressure in said fluid pressure source; and said servo-control means, upon release from said intermediate member means, being movable by an additional amount beyond normal braking movement and connected to said safety vehicle braking means to operate said safety vehicle braking means.

2. A device as claimed in claim 1, wherein said servo-control means and said intermediate member means respectively comprise first and second hollow fluid tight elements, one of said elements being telescopically movably mounted within the other of said elements, and said locking means comprises a fluid connection from said fluid pressure source to internally of said elements to move said elements telescopically away from each other.

3. A device as claimed in claim 2, wherein said first element telescopically surrounds said second element; and further comprising a hydraulic control cylinder operatively connected to said safety vehicle braking means, said first element comprising a piston movably positioned in said hydraulic control cylinder.

4. A device as claimed in claim 1, wherein said servo-control means comprises a pedal mounted to pivot about a fixed fulcrum shaft; said intermediate member means comprises an element mounted to pivot about said shaft; and said locking means comprises a retractable hydraulic piston operable in response to pressure from said fluid pressure source to move from a non-locking position to a locking position to lock said pedal to said element.

5. A device as claimed in claim 4, further comprising spring means for urging said piston to said non-locking position upon drop of pressure in said fluid pressure source.

6. In a servo-controlled motor vehicle brake system of the type including a fluid pressure source, fluid operated vehicle braking means, safety vehicle braking means, servo valve means fluid connected between said fluid pressure source and said fluid operated vehicle braking means, and movable conventional foot-operated servo-control means for selectively operating said servo valve means to supply fluid under pressure from said fluid pressure source to said fluid operated vehicle braking means for a normal braking operation; the improvement comprising:
   an intermediate member means operatively connected between said servo-control means and said servo valve means for transmitting movement of said servo-control means to said servo valve means;
   means, responsive to pressure from said fluid pressure source, for locking said intermediate member means in a fixed position with respect to said servo-control means during normal braking operation and for releasing said servo-control means upon drop of pressure in said fluid pressure source; and said servo-control means, upon release from said intermediate member means, being movable by an additional amount beyond normal braking movement and connected to said safety vehicle braking means to operate said safety vehicle braking means.

7. The improvement claimed in claim 6, wherein said servo-control means and said intermediate member means respectively comprise first and second hollow fluid tight elements, one of said elements being telescopically movably mounted within the other of said elements, and said locking means comprises a fluid connection from said fluid pressure source to internally of said elements to move said elements telescopically away from each other.

8. The improvement claimed in claim 7, wherein said first element telescopically surrounds said second element; and further comprising a hydraulic control cylinder operatively connected to said safety vehicle braking means, said first element comprising a piston movably positioned in said hydraulic control cylinder.

9. The improvement claimed in claim 6, wherein said servo-control means comprises a pedal mounted to pivot about a fixed fulcrum shaft; said intermediate member means comprises an element mounted to pivot about said shaft; and said locking means comprises a retractable hydraulic piston operable in response to pressure from said fluid pressure source to move from a non-locking position to a locking position to lock said pedal to said element.

10. The improvement claimed in claim 9, further comprising spring means for urging said piston to said non-locking postion upon drop of pressure in said fluid pressure source.

* * * * *